(12) United States Patent
Stahler

(10) Patent No.: US 8,155,994 B2
(45) Date of Patent: Apr. 10, 2012

(54) SYSTEM AND METHOD FOR SCHEDULE INTERRUPT COST ANALYSIS

(75) Inventor: Joanne L. Stahler, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1653 days.

(21) Appl. No.: 11/461,711

(22) Filed: Aug. 1, 2006

(65) Prior Publication Data

US 2008/0034368 A1   Feb. 7, 2008

(51) Int. Cl.
*G06Q 10/00* (2012.01)
(52) U.S. Cl. .................................. 705/7.35; 705/400
(58) Field of Classification Search .................. 705/7.35, 705/400
See application file for complete search history.

(56) References Cited

U.S. PATENT DOCUMENTS

| | | | |
|---|---|---|---|
| 7,230,527 B2 * | 6/2007 | Basu et al. ..................... | 340/506 |
| 7,565,331 B2 * | 7/2009 | Cutler et al. .................. | 705/400 |
| 2004/0205398 A1 * | 10/2004 | Osborn et al. .................. | 714/25 |
| 2008/0034368 A1 * | 2/2008 | Stahler .......................... | 718/102 |
| 2009/0083089 A1 * | 3/2009 | Conchieri et al. ................ | 705/7 |
| 2010/0030807 A1 * | 2/2010 | Topping ..................... | 707/104.1 |

\* cited by examiner

*Primary Examiner* — Shannon Campbell
(74) *Attorney, Agent, or Firm* — Weiss & Moy, P.C.

(57) ABSTRACT

A system and method for performing cost analysis on airplane schedule interruptions comprises entering data relating to schedule interrupt events. All schedule interrupt events for a specified period of time are then summarized. Partial schedule interrupt event counts are removed when calculating average delay hours associated with a particular schedule interrupt event grouping. An average total delay cost per schedule interrupt event type is calculated wherein the partial schedule interrupt event counts are used in the calculation of average total delay cost per schedule interrupt event type.

16 Claims, 6 Drawing Sheets

Schedule Interruption Summary By ASN

| ASN | ASN Nomenclature | Delays>15 | CNX | ATB | DIV | Sch Ints | Sch Ints Per 100 Rev Deps |
|---|---|---|---|---|---|---|---|
| Summary | | 5239.00 | 56.00 | 86.00 | 34.00 | 5415.00 | 1.444715 |
| 36-11 | BLEED AIR CONTROL AND DISTRIBUTION | 185.00 | 1.00 | 3.23 | 1.00 | 190.23 | 0.050754 |
| 73-21 | ENGINE FUEL CONTROL | 145.75 | 4.00 | 1.67 | 0.00 | 151.42 | 0.040398 |
| 80-11 | ENGINE STARTING COMPONENTS | 135.17 | 1.00 | 1.00 | 1.00 | 138.17 | 0.036663 |
| 72-00 | ENGINE (ENGINE MFG COMPONENTS ONLY) | 95.92 | 9.00 | 15.83 | 7.50 | 128.25 | 0.034217 |
| 23-00 | COMMUNICATIONS | 124.08 | 0.00 | 0.00 | 0.00 | 124.08 | 0.033105 |
| 28-00 | FUEL | 119.50 | 0.00 | 0.00 | 1.00 | 120.50 | 0.032149 |
| 24-32 | DC GENERATION | 105.00 | 1.00 | 0.00 | 0.00 | 106.00 | 0.028281 |
| 23-35 | ENTERTAINMENT | 93.08 | 0.00 | 0.00 | 0.00 | 93.08 | 0.024835 |
| 52-31 | CARGO COMPARTMENT DOORS | 88.00 | 0.00 | 1.00 | 0.00 | 89.00 | 0.023745 |
| 28-21 | PRESSURE FUELING | 87.00 | 0.00 | 0.00 | 0.00 | 87.00 | 0.023212 |
| 49-00 | AIRBORNE AUXILIARY POWER | 84.17 | 1.00 | 0.00 | 0.00 | 85.17 | 0.022722 |
| 28-22 | ENGINE FUEL FEED | 78.00 | 1.00 | 0.00 | 0.00 | 79.00 | 0.021077 |
| 29-11 | MAIN HYDRAULIC SYSTEM | 68.83 | 2.00 | 2.25 | 1.00 | 74.08 | 0.019765 |
| 23-30 | PSGR ADDRESS AND ENTERTAINMENT | 66.83 | 0.00 | 0.00 | 0.00 | 66.83 | 0.017831 |
| 36-10 | PNEUMATICS CONTROL AND DISTRIBUTION | 61.50 | 1.00 | 0.00 | 0.00 | 62.50 | 0.016675 |
| 24-23 | AC GENERATION CONTROL | 57.33 | 1.00 | 1.00 | 1.67 | 61.00 | 0.016275 |
| 25-26 | MAIN CABIN CARGO EQUIPMENT | 58.67 | 0.00 | 0.00 | 0.00 | 58.67 | 0.015652 |
| 32-42 | LANDING GEAR WHEEL ANTI-SKID | 54.00 | 0.00 | 0.00 | 0.00 | 54.00 | 0.014407 |
| 28-41 | FUEL QUANTITY INDICATING | 52.50 | 0.00 | 0.00 | 0.00 | 52.50 | 0.014007 |
| 32-41 | LANDING GEAR HYDRAULIC BRAKES | 49.75 | 0.00 | 1.00 | 1.00 | 51.75 | 0.013807 |
| 21-27 | EQUIPMENT COOLING | 47.33 | 0.00 | 2.00 | 0.00 | 49.33 | 0.013162 |
| 21-51 | AIR CYCLE SYSTEM | 45.50 | 1.00 | 2.00 | 0.00 | 48.50 | 0.012940 |
| 24-13 | GENERATOR DRIVE/ACCESSORIES | 46.25 | 0.00 | 0.00 | 0.33 | 46.58 | 0.012428 |
| 27-21 | FC RUDDER AND TAB CONTROL | 44.00 | 1.00 | 1.00 | 0.00 | 46.00 | 0.012273 |
| 27-81 | LEADING EDGE FLAP AND SLAT CONTROL | 38.00 | 2.50 | 2.00 | 1.00 | 43.50 | 0.011606 |
| 31-61 | INTEGRATED DISPLAY SYSTEM (IDS) | 43.33 | 0.00 | 0.00 | 0.00 | 43.33 | 0.011561 |
| 38-33 | TOILET CONTROL | 41.50 | 0.00 | 0.00 | 0.00 | 41.50 | 0.011072 |
| 56-11 | FLIGHT COMPARTMENT FIXED WINDOWS | 39.00 | 0.00 | 1.00 | 1.00 | 41.00 | 0.010939 |
| 27-51 | FLGHT CONT TE FLAP CONTROL | 37.50 | 1.00 | 2.00 | 0.00 | 40.50 | 0.010805 |
| 78-34 | ENGINE THRUST REVERSER CONTROL | 40.33 | 0.00 | 0.00 | 0.00 | 40.33 | 0.010761 |
| 24-00 | ELECTRICAL POWER | 39.33 | 0.00 | 0.00 | 0.00 | 39.33 | 0.010494 |
| 33-51 | EMERGENCY EXIT LIGHTS | 37.75 | 0.00 | 0.00 | 0.00 | 37.75 | 0.010072 |
| 32-40 | LANDING GEAR WHEEL AND BRAKE | 37.50 | 0.00 | 0.00 | 0.00 | 37.50 | 0.010006 |

| SI Event ID | Component ATA | Interrupt Type | Event Count | Delay Time |
|---|---|---|---|---|
| 1406510 | 2781008351 | DIVERSION | 0.25 | |
| 1406510 | 2781241011 | DIVERSION | 0.25 | |
| 1406510 | 2781687151 | DIVERSION | 0.25 | |
| 1406510 | 2781576552 | DIVERSION | 0.25 | |
| 1531035 | 3616192041 | DELAY | 0.17 | 0.57 |
| 1531035 | 3611576281 | DELAY | 0.17 | 0.57 |
| 1531035 | 2151522091 | DELAY | 0.17 | 0.57 |
| 1531035 | 3611536011 | DELAY | 0.17 | 0.57 |
| 1531035 | 3612576441 | DELAY | 0.17 | 0.57 |
| 1531035 | 3611576391 | DELAY | 0.17 | 0.57 |
| 1604934 | 3611576281 | CANCELLATION | 0.25 | |
| 1604934 | 3611522201 | CANCELLATION | 0.25 | |
| 1604934 | 3611576391 | CANCELLATION | 0.25 | |
| 1604934 | 3612460151 | CANCELLATION | 0.25 | |
| 1747261 | 3612576441 | AIR TURNBACK | 0.14 | |
| 1747261 | 3611536011 | AIR TURNBACK | 0.14 | |
| 1747261 | 3612460151 | AIR TURNBACK | 0.14 | |
| 1747261 | 3611576391 | AIR TURNBACK | 0.14 | |
| 1747261 | 3612452311 | AIR TURNBACK | 0.14 | |
| 1747261 | 3611576281 | AIR TURNBACK | 0.14 | |
| 1747261 | 3611142031 | AIR TURNBACK | 0.14 | |

Figure 4

| RPT_GRP_DS | ASN | Interrupt Type | Events | Avg Dly | Avg per hr Dly Cost | Operator Cost |
|---|---|---|---|---|---|---|
| 747 400 ALL | 29-11 | DELAY | 0.33 | 2.03 | $16,000 | $10,826 |
| 747 400 ALL | 29-11 | DELAY | 0.50 | 1.50 | $16,000 | $12,000 |
| 747 400 ALL | 29-11 | DELAY | 0.50 | 8.62 | $16,000 | $68,960 |
| 747 400 ALL | 29-11 | DELAY | 0.50 | 2.72 | $16,000 | $21,760 |
| 747 400 ALL | 29-11 | DELAY | 0.50 | 0.62 | $16,000 | $4,960 |
| 747 400 ALL | 29-11 | DELAY | 0.50 | 1.18 | $16,000 | $9,440 |
| 747 400 ALL | 29-11 | DELAY | 0.50 | 3.13 | $16,000 | $25,040 |
| 747 400 ALL | 29-11 | DELAY | 0.50 | 0.38 | $16,000 | $3,040 |
| 747 400 ALL | 29-11 | DELAY | 0.50 | 1.18 | $16,000 | $9,440 |
| 747 400 ALL | 29-11 | DELAY | 0.50 | 0.38 | $16,000 | $3,040 |
| 747 400 ALL | 29-11 | DELAY | 0.50 | 0.33 | $16,000 | $2,640 |
| 747 400 ALL | 29-11 | DELAY | 0.50 | 0.62 | $16,000 | $4,960 |
| 747 400 ALL | 29-11 | DELAY | 1.00 | 2.47 | $16,000 | $39,520 |
| 747 400 ALL | 29-11 | DELAY | 1.00 | 1.20 | $16,000 | $19,200 |
| 747 400 ALL | 29-11 | DELAY | 1.00 | 0.38 | $16,000 | $6,080 |
| 747 400 ALL | 29-11 | DELAY | 1.00 | 0.47 | $16,000 | $7,520 |
| 747 400 ALL | 29-11 | DELAY | 1.00 | 1.05 | $16,000 | $16,800 |
| 747 400 ALL | 29-11 | DELAY | 1.00 | 0.98 | $16,000 | $15,680 |
| 747 400 ALL | 29-11 | DELAY | 1.00 | 1.08 | $16,000 | $17,280 |
| 747 400 ALL | 29-11 | DELAY | 1.00 | 3.52 | $16,000 | $56,320 |
| 747 400 ALL | 29-11 | DELAY | 1.00 | 4.22 | $16,000 | $67,520 |
| 747 400 ALL | 29-11 | DELAY | 1.00 | 3.22 | $16,000 | $51,520 |
| 747 400 ALL | 29-11 | DELAY | 1.00 | 0.78 | $16,000 | $12,480 |
| 747 400 ALL | 29-11 | DELAY | 1.00 | 0.70 | $16,000 | $11,200 |
| 747 400 ALL | 29-11 | DELAY | 1.00 | 2.17 | $16,000 | $34,720 |
| 747 400 ALL | 29-11 | DELAY | 1.00 | 1.63 | $16,000 | $26,080 |
| 747 400 ALL | 29-11 | DELAY | 1.00 | 2.10 | $16,000 | $33,600 |
| 747 400 ALL | 29-11 | DELAY | 1.00 | 1.00 | $16,000 | $16,000 |
| 747 400 ALL | 29-11 | DELAY | 1.00 | 4.00 | $16,000 | $64,000 |
| 747 400 ALL | 29-11 | DELAY | 1.00 | 0.75 | $16,000 | $12,000 |
| 747 400 ALL | 29-11 | DELAY | 1.00 | 2.15 | $16,000 | $34,400 |
| 747 400 ALL | 29-11 | DELAY | 1.00 | 0.85 | $16,000 | $13,600 |
| 747 400 ALL | 29-11 | DELAY | 1.00 | 2.92 | $16,000 | $46,720 |
| 747 400 ALL | 29-11 | DELAY | 1.00 | 1.97 | $16,000 | $31,520 |
| 747 400 ALL | 29-11 | DELAY | 1.00 | 1.58 | $16,000 | $25,280 |
| 747 400 ALL | 29-11 | DELAY | 1.00 | 0.50 | $16,000 | $8,000 |
| 747 400 ALL | 29-11 | DELAY | 1.00 | 1.33 | $16,000 | $21,280 |
| 747 400 ALL | 29-11 | DELAY | 1.00 | 3.22 | $16,000 | $51,520 |

Figure 5

| Model/Series | ASN | ATA_DESC | Event Count | Sched Interrupt Cost | Std Reports Rank | Evt Ct (Frac <1) | Delay Time Avg (Frac <1) | Avg Dly | Evt Ct (Frac =1) | Delay Time Avg (Frac =1) | Avg Dly |
|---|---|---|---|---|---|---|---|---|---|---|---|
| 747 400 ALL | 72-00 | ENGINE ASSY TYPE CF6-6K | 130.25 | $11,639,629 | 5 | 23 | 5.84 | 234 | 6.18 |
| 747 400 ALL | 73-21 | ENGINE FUEL CONTROL | 144.92 | $6,814,205 | 3 | 118 | 3.24 | 368 | 2.67 |
| 747 400 ALL | 36-11 | BLEED AIR CONTROL AND DISTRIBUTION | 195.40 | $5,052,186 | 1 | 178 | 2.10 | 638 | 1.46 |
| 747 400 ALL | 80-11 | ENGINE STARTING SYS | 151.17 | $4,605,109 | 2 | 128 | 3.10 | 338 | 1.74 |
| 747 400 ALL | 27-21 | FC RUDDR AND TAB CONT | 46.00 | $4,155,557 | | 5 | 3.75 | 109 | 5.65 |
| 747 400 ALL | 28-00 | FUEL | 130.50 | $3,639,327 | 6 | 48 | 1.36 | 271 | 1.71 |
| 747 400 ALL | 27-81 | LEADING EDGE FLAP AND SLAT CONTROL | 45.50 | $3,100,929 | | 22 | 3.70 | 133 | 3.81 |
| 747 400 ALL | 29-11 | MAIN HYDRAULIC SYSTEMS | 75.08 | $2,777,696 | 13 | 32 | 1.83 | 194 | 2.12 |
| 747 400 ALL | 56-11 | FLIGHT COMPARTMENT FIXED WINDOWS | 41.00 | $2,621,327 | | 7 | 5.66 | 92 | 3.86 |
| 747 400 ALL | 24-32 | BATTERY | 107.00 | $2,535,610 | 7 | 289 | 1.27 | 199 | 1.33 |
| 747 400 ALL | 28-22 | ENGINE FUEL FEED | 81.00 | $2,471,137 | 11 | 34 | 2.10 | 230 | 1.81 |
| 747 400 ALL | 52-31 | CCPT DOOR | 91.50 | $2,329,828 | 9 | 20 | 6.81 | 213 | 1.55 |
| 747 400 ALL | 23-00 | COMMUNICATIONS | 131.08 | $2,235,077 | 4 | 74 | 2.20 | 310 | 1.07 |
| 747 400 ALL | 78-34 | ENGINE THRUST REVERSER CONTROL | 43.33 | $2,227,904 | | 27 | 5.60 | 99 | 3.21 |
| 747 400 ALL | 73-11 | FUEL DISTRIBUTION SYSTEM | 34.58 | $1,890,834 | | 16 | 4.76 | 77 | 3.36 |
| 747 400 ALL | 28-21 | PRESSURE FUELING | 79.00 | $1,822,962 | 12 | 18 | 1.36 | 194 | 1.44 |
| 747 400 ALL | 27-51 | TRAILING EDGE FLAPS | 38.50 | $1,708,639 | | 15 | 1.11 | 94 | 2.44 |
| 747 400 ALL | 24-23 | AC GENERATION CONTROL | 59.33 | $1,644,126 | 17 | 40 | 1.23 | 160 | 1.37 |
| 747 400 ALL | 27-58 | TE FLAP PSN INDG AND WARNG | 28.00 | $1,638,495 | | 9 | 3.03 | 131 | 3.44 |
| 747 400 ALL | 21-27 | EQUIPMENT COOLING | 49.33 | $1,594,676 | | 23 | 1.40 | 131 | 1.98 |
| 747 400 ALL | 36-10 | PNEUMATICS CONTROL AND DISTRIBUTION | 62.00 | $1,501,815 | 15 | 19 | 1.57 | 133 | 1.38 |
| 747 400 ALL | 75-31 | COMPR BLEED AND VARBL STATR CONT | 20.00 | $1,475,070 | | 21 | 3.16 | 37 | 4.43 |
| 747 400 ALL | 32-41 | LANDING GEAR HYDRAULIC BRAKES | 51.75 | $1,456,946 | 19 | 40 | 1.46 | 138 | 1.58 |
| 747 400 ALL | 32-42 | LG WHEEL ANTSK | 54.00 | $1,333,734 | 16 | 27 | 2.46 | 147 | 1.54 |
| 747 400 ALL | 49-00 | AIRBORNE AUXILIARY POWER | 86.33 | $1,309,435 | 10 | 45 | 1.23 | 194 | 0.85 |
| 747 400 ALL | 52-32 | MAIN DECK SIDE CARGO (MCDR) | 36.00 | $1,273,259 | | 21 | 2.99 | 124 | 2.21 |
| 747 400 ALL | 79-32 | ENGINE OIL PRESSURE INDICATING | 35.00 | $1,251,497 | | 11 | 1.25 | 97 | 2.02 |
| 747 400 ALL | 79-21 | ENGINE OIL DISTRIBUTION COMPONENTS | 25.33 | $1,239,498 | | 16 | 4.62 | 51 | 2.59 |
| 747 400 ALL | 72-31 | ENGINE FRONT COMPRESSOR SECTION | 15.50 | $1,229,377 | | 13 | 3.01 | 33 | 4.94 |

Figure 6

SYSTEM AND METHOD FOR SCHEDULE INTERRUPT COST ANALYSIS

BACKGROUND OF THE INVENTION

1. Field of the Invention

The present invention relates generally to aircraft maintenance, and more particularly, to a system and method for performing cost analysis on airplane schedule interruptions.

2. Background Information

Airplane schedule interruptions are delays cancellations air turnbacks or diversions which are due to an unplanned mechanical/maintenance problem Schedule interruptions may cost an airline millions of dollars each year.

Presently the current methodology for monitoring system interrupts does not incorporate cost data into the equation. Rather, the current metrics produce results in terms of the raw number of scheduled interrupts events per number of departures. The general limitation involved in the current methodology lies in the fact that while raw event counts offer a glimpse into certain schedule interrupt trends, such trends allow prioritization only in terms of event frequency, and not in terms of the actual dollar cost to an airline in dealing with such schedule interrupt events.

For example, assume event 'X', a particular class of schedule interrupt events (i.e., an event associated with a particular ATA group for a particular airplane model) occurs 100 times in a calendar year, while another class, event 'Y', occurs only 90 times during the same year. When viewed only in terms of raw event counts, event X appears to outrank event Y by approximately a 10% margin. However, if, in fact, the average aircraft downtime associated with event X is one hour, while that for event Y is two hours, it now appears that not only has the ranking order shifted (X at 100 hrs per year, and Y at 180 hrs per year), the associated aircraft downtime to deal with event Y overrides that for event X by approximately an 80% margin.

The use of aircraft downtime as a metric strongly associated with airline cost, offers an informed, and well-understood perspective on the ranking of schedule interrupt event categories. Such rankings are used by both aircraft manufacturers and airline customers to prioritize work efforts, and to target new technological development to minimize schedule interrupt event occurrences.

Current schedule interrupt driver rankings shifted significantly for each aircraft model evaluated. This indicates that current schedule interrupt driver ranking model does not provide a good basis for, or correlation to actual airline cost incurred. The use of the current method ostensibly leads the analyst to incorrect conclusions, and inappropriate work focus.

Therefore it would be desirable to provide a system and method that overcomes the problems associated with the prior art. The system and method will provide a means of appropriately distinguishing and ranking schedule interrupt event groups based on airline costs typically associated with such event categories to achieve such consistent, cost-based, relative rankings.

SUMMARY OF THE INVENTION

A method for performing cost analysis on airplane schedule interruptions is disclosed. The method comprises entering data relating to schedule interrupt events. The schedule interrupt events are summarized for a specified period of time. Partial schedule interrupt event counts are removed when calculating average delay hours associated with a particular schedule interrupt event grouping. An average total delay cost per schedule interrupt event type is calculated wherein the partial schedule interrupt event counts are used in the calculation of average total delay cost per schedule interrupt event type.

A computer system comprising a processor for executing program instructions and memory coupled to the processor for storing the program instructions is disclosed. The programming instructions comprises: entering data relating to a schedule interrupt event; summarizing all schedule interrupt events for a specified period of time; removing partial schedule interrupt event counts when calculating average delay hours associated with a particular schedule interrupt event grouping; and calculating an average total delay cost per schedule interrupt event type wherein the partial schedule interrupt event counts are used in the calculation of average total delay cost per schedule interrupt event type.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 2 is a screen view of a maintenance website, the data gathered may be used for performing cost analysis on airplane schedule interruptions;

FIG. 3 is a summary of different schedule interrupts generated by the present invention;

FIG. 4 is an example of an aircraft schedule interrupt attributable to multiple components and different sub-classifications;

FIG. 5 is a listing of all the schedule interrupt delays caused by a specified component and/or subcomponent generated by the present invention; and FIG. 6 is a ranking generated by the present invention of schedule interrupt event groups based on airline costs based on cost only associated with whole number schedule interrupt events.

DETAILED DESCRIPTION OF THE PREFERRED EMBODIMENTS

Figure 1:
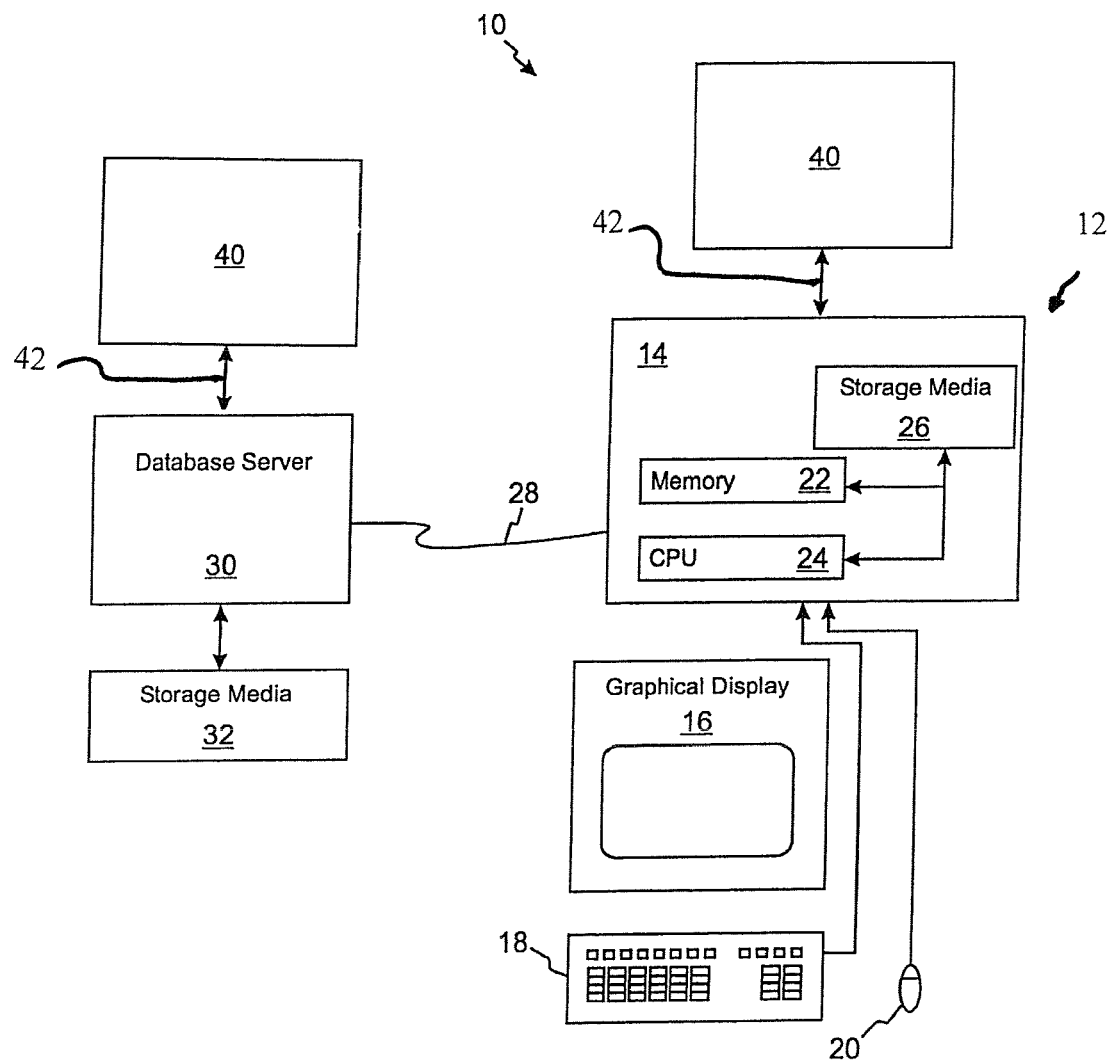
FIG. 1 is a is a simplified block diagram of a system for performing cost analysis on airplane schedule interruptions.

Referring to FIG. 1, a system 10 for performing cost analysis on airplane schedule interruptions is shown. The system 10 generally uses a main computer system 12. The computer system 12 will have a processor unit 14 and a display 16. Input devices are coupled to the processor unit 14. The input devices may be a keyboard 18, a mouse 20 and the like. Through the execution of program instructions forming a computer program product within the computer system 12, the computer system 12 will provide a means of appropriately distinguishing and ranking schedule interrupt event groups based on airline costs typically associated with such event categories.

The program instructions may be located within a memory 22 of the processor unit 14 and executed by a central processing unit 24 (CPU). Any data stored from the running of the program instructions such as ranking schedule interrupt event groups based on airline costs and the like may be stored entirely within a storage media 26 and/or the memory 22.

Alternatively, the computer system 12 may have a connection 28 to a network such as a local-area network (LAN), wide-area network (WAN) or the Internet. The connection 28 may be a wired connection, a wireless connection, or the like. In a network implementation, the program instructions may be located within a database server 30. Any data stored such as test results and the like may be stored in a storage media 32 coupled to the database server 30.

One or more outside computers 40 may be coupled to the main computer system 12 and/or the database server 30 via a connection 42. The connection 42 may be via a local-area network (LAN), wide-area network (WAN) or the Internet. The connection 42 may be a wired connection, a wireless connection, or the like. The outside computers 40 will have limited access to the main computer system 12 and/or the database server 30. The outside computers 40 will allow another party to input maintenance information of desired aircraft into the main computer system 12 and/or the database server 30.

Information regarding aircraft maintenance will be loaded into the main computer system 12 and/or the database server 30. The information regarding aircraft maintenance may be collected from, but not limited to, airlines, aircraft maintenance companies, aircraft manufacturers, and the like. The maintenance information collected will generally include the airplane model, airplane type, airplane engine, as well as the classification, sub-classification, and type of the schedule interrupt.

The information regarding aircraft maintenance that is loaded into the main computer system 12 and/or the database server 30 may be gathered in different manners. The information recorded from the airlines, aircraft maintenance companies, aircraft manufacturers, and the like may be sent directed to a designated individual(s) who will then load this information into the main computer system 12 and/or the database server 30.

Figure 2:
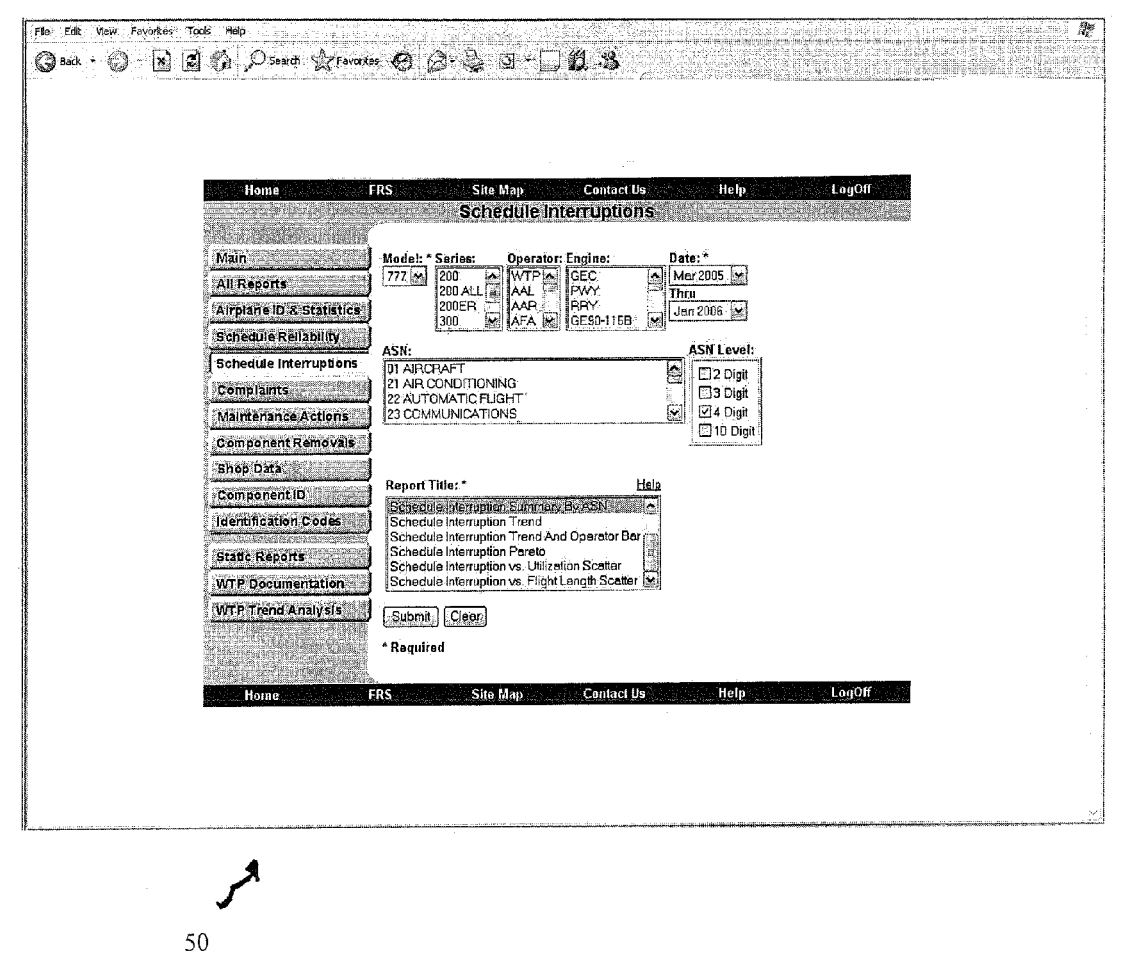

In accordance with one embodiment, as shown in FIG. 2, a maintenance website 50 may be used to gather aircraft maintenance information. The maintenance website 50 will be used by airlines, aircraft maintenance companies, aircraft manufacturers, and the like to enter aircraft maintenance information. For security reasons, access to the maintenance website 50 may be limited. A user name and/or password may be required to access the maintenance website 50. As shown in FIG. 2, the maintenance website 50 will allow authorized individuals to enter airplane, model, airplane type, airplane engine, as well as the classification, sub-classification, and type of the schedule interrupt. Other methods may be used to gather the aircraft maintenance information without departing from the spirit and scope of the present invention.

Referring to FIG. 3, after the information regarding aircraft maintenance is loaded into the main computer system 12 and/or the database server 30, the main computer system 12 and/or the database server 30 will generate a summary 60 of different schedule interrupt events. For the reports generated by the main computer system 12 and/or the database server 30, in order to maintain consistency, the analysis generally excludes all schedule interrupt events shorter than fifteen minutes in duration, as well as events which exceed reasonable interrupt duration. Furthermore, the analysis excludes any schedule interrupt events which are classified as 'non-chargeable'. That is any schedule interrupts resulting from human error, and not from equipment fault.

The summary 60 is for a specific model and series of aircraft and for a specified period of time. The summary 60 shows the number of each type of schedule interrupt event. The schedule interrupt events are broken down into different sub-classifications. The schedule interrupts events are also broken down by delays, cancellations air turnbacks or diversions.

As may be seen in FIG. 3, the number of schedule interrupts is not always accrued in simple, integer form. This is due to the fact that, under certain circumstances, an aircraft schedule interrupt may be attributable to multiple components, and even vastly different sub-classifications. When this occurs, the contribution of a specific single event is split fractionally amongst the various contributors to the event.

An example of the above is shown in FIG. 4. As may be seen, four different schedule interrupt events are shown. Each of the schedule interrupts are caused by multiple components. Schedule interrupt event 1531035 caused a schedule interrupt delay of 0.57 hours which is equal to 34.2 minutes. The delay was caused by six different components. Thus, the event count is split evenly among the six components. This delay time becomes important in the derivation of airline cost, as the generic values typically associated with schedule interrupt events offers average delay cost in terms of 'dollars per delay hour', as opposed to the 'dollars per event', as typically calculated for diversions, cancellations, and air turnbacks. Schedule interrupt event counts are heavily dominated by Delays, making this category the overriding contributor to both schedule interrupt event counts and the associated schedule interrupt event-related cost.

Referring back to FIG. 3, as shown in the highlighted section, the total number of schedule interrupt events caused by the main hydraulic system number 74.08 for the listed time frame, The 74.08 schedule interrupt events made the main hydraulic system rank 13 as far as the total number of system interrupts. However, as stated above, rankings based solely on raw event counts do not show the actual dollar cost to an airline in dealing with such schedule interrupt events. Given the above-stated overlaps in schedule interrupt event counting, and the associated duplication of delay times, it's evident that direct computation of schedule interrupt driver ranking in terms of cost is not possible.

Referring now to FIG. 5, the main computer system 12 and/or the database server 30 can generate a listing 70 of all the schedule interrupt delays caused by the "main hydraulic system" 29-11. As may be seen, all the schedule interrupt delays caused by the "main hydraulic system" 29-11 also includes the delay time associated with each event. An operator cost for each schedule interrupt delay event is also shown. The operator cost is calculated by using a cost associated per delay hour. This value may be obtained from a yearly publication from the Airline Economic Analysis Organization. The Airline Economic Analysis Organization provides statistics for each make and model of aircraft. For example, a '2004 Airplane Economic and Fleet Factors' for the 777 fleet, as provided by the Airline Economic Analysis Organization is shown below:

| 777 | |
|---|---|
| Fleet Size: | 30 Airplanes |
| Average Flight Time per Flight: | 6.0 Hr |
| Average Flights per Year: | 715 |
| Average Delay Cost per Delay Hour: | $12,500 |
| Average Cancellation Cost per Cancellation: | $105,000 |
| Average Air Turnback Cost per Turnback: | $58,100 |
| Average Diversion Cost per Diversion: | $78,000 |
| Average Daily Out-Of-Service Cost: | $103,000 |

The cost associated per delay time hour provided by the Airline Economic Analysis Organization is then multiplied by the actual delay time for each schedule interrupt event to calculate operator cost for each schedule interrupt delay event.

As can be seen, the number of schedule interrupts is not always accrued in simple integer form since an aircraft schedule interrupt may be attributable to multiple components, and different sub-classifications. However, as may be seen certain partial schedule interrupts may skew ranking schedule interrupt event groups based on airline costs typically associated with such event.

For example, as shown in the highlighted section in FIG. 5, the third schedule interrupt delay listed had an abnormally high cost associated with the schedule interrupt delay since the delay time amounted to 8.62 hours. The delay time associated with the highlighted schedule interrupt delay is abnormally high. The time delay is twice as long as any other schedule interrupt delay listed for a whole number schedule interrupt delay of a similar classification and sub-classification. Thus, the partial schedule interrupt delays will skew the average cost associated per schedule interrupt. Several other partial schedule interrupts also have an abnormally high cost associated with the schedule interrupt delay. Given the above-stated overlaps in schedule interrupt event counting, and the associated duplication of delay times, it's evident that direct computation of schedule interrupt driver ranking in terms of cost is not possible. Because of this, the current method of SI driver determination accounts only for strict numbers of SI events, and does not attempt to calculate comparative costs.

Significant changes in the schedule interrupt ranking will occur when airline cost is taken into consideration. However, as shown above, given the above-stated overlaps in schedule interrupt event counting, and the associated duplication of delay times, it's evident that direct computation of schedule interrupt driver ranking in terms of cost is not possible. However, if the partial schedule interrupt delay times are not taken into account when calculating the associated average delay time, a means of appropriately distinguishing and ranking schedule interrupt event groups based on airline costs typically associated with such event categories is achieved with consistent, cost-based, relative rankings.

Referring to FIG. 6, a ranking of schedule interrupt event groups based on airline costs is shown. The rankings are based upon the combination of all schedule interrupt event types. The partial event counts are omitted from the portion of the calculation which derives the average delay hours associated with a particular event grouping, as in the following equation: (# of delay events [for ALL delay events])×(average delay hours [for whole-number delay events only])×(cost/delay hour)=(average total delay cost). As indicated, the partial event counts are used in the subsequent final calculation of average total delay cost. Furthermore, as stated above, in order to maintain consistency, the analysis excludes all schedule interrupt events shorter than fifteen minutes in duration, as well as events which exceed reasonable interrupt duration. The analysis also excludes any schedule interrupt events which are classified as 'non-chargeable'. That is any schedule interrupts resulting from human error, and not from equipment fault.

FIG. 6 further includes a "Sched Interrupt Cost" column. The "Sched Interrupt Cost" column shows an aggregate schedule interruption cost for the different schedule interrupt event groups shown. This column will combine the average total delay cost calculated above with costs associated with cancellations, air turnbacks, and diversions to provide an aggregate schedule interruption cost for the different schedule interrupt event groups.

Since the above-stated overlaps in schedule interrupt event counting, and the associated duplication of delay times are not taken into account, a direct computation of schedule interrupt driver ranking in terms of average cost is possible. As can be seen in FIG. 6, the rankings of schedule interrupts change dramatically when actual airline costs and a modified schedule interrupt count is used instead of a raw event count ranking. As highlighted, the "main hydraulic system" which originally was ranked $13^{th}$ is now ranked $8^{th}$ and considered more of a problem. By manipulating the inclusion of partial schedule interrupt events, a means of appropriately distinguishing and ranking schedule interrupt event groups based on airline costs typically associated with such event categories is achieved with consistent, cost-based, relative rankings.

The method employed to determine cost-based schedule interrupt drivers is very robust, easily extended to the various levels of component and sub-component breakdown, allowing for either high- or low-level focus on associated airline costs. This permits a program-level perspective on the impact of various systems ranked against one another, and also allows a more detailed perspective on the ranking of the various sub-components within a single component chapter.

For example, the method will allow an airplane manufacturer to generate reports related to the schedule interrupts for a specified time frame. More specifically, the method will provide a means of appropriately distinguishing and ranking schedule interrupt events based on airline costs typically associated with such event categories to achieve such consistent, cost-based, relative rankings.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method for performing cost analysis on airplane schedule interruptions comprising:
    summarizing schedule interrupt events for a specified period of time;
    removing partial schedule interrupt event counts when calculating average delay hours associated with a particular schedule interrupt event grouping; and
    calculating, by a processor, an average total delay cost per schedule interrupt event type wherein the partial schedule interrupt event counts are used in the calculation of average total delay cost per schedule interrupt event type.

2. The method of claim 1 wherein calculating an average total delay cost per schedule interrupt event type comprises:
    calculating a total number of delay events for the particular schedule interrupt event grouping, the total number of delay events for the particular schedule interrupt event grouping including all delay events for the event grouping; and
    multiplying the total number of delay events for the particular schedule interrupt event grouping with the average delay hours with partial schedule interrupt event counts removed and with the cost per delay hour.

3. The method of claim 2 wherein the cost per delay hour is taken from statistics provided by an Airline Economic Analysis Organization for the specific model and series of aircraft.

4. The method of claim 1 further comprising calculating a total cost per schedule interrupt event type.

5. The method of claim 1 further comprising ranking each schedule interrupt event type based on the average cost per schedule interrupt event type.

6. A method for performing cost analysis on airplane schedule interruptions comprising:
   entering data relating to a schedule interrupt event;
   summarizing all schedule interrupt events for a specified period of time;
   removing partial schedule interrupt event counts when calculating average delay hours associated with a particular schedule interrupt event grouping; and
   calculating, by a processor, an average total delay cost per schedule interrupt event type wherein the partial schedule interrupt event counts are used in the calculation of average total delay cost per schedule interrupt event type.

7. The method of claim 6 wherein calculating an average total delay cost per schedule interrupt event type comprises:
   calculating a total number of delay events for the particular schedule interrupt event grouping, the total number of delay events for the particular schedule interrupt event grouping including all delay events for the event grouping; and
   multiplying the total number of delay events for the particular schedule interrupt event grouping with the average delay hours with partial schedule interrupt event counts removed and with the cost per delay hour.

8. The method of claim 7 wherein the cost per delay hour is taken from statistics provided by an Airline Economic Analysis Organization for the specific model and series of aircraft.

9. The method of claim 6 further comprising calculating a total cost per schedule interrupt event type.

10. The method of claim 6 further comprising ranking each schedule interrupt event type based on the average cost per schedule interrupt event type.

11. A method for performing cost analysis on airplane schedule interruptions comprising:
    removing partial schedule interrupt event counts when calculating average delay hours associated with a particular schedule interrupt event grouping; and
    calculating, by a processor, an average total delay cost per schedule interrupt event type wherein the partial schedule interrupt event counts are used in the calculation of average total delay cost per schedule interrupt event type.

12. The method of claim 11 wherein calculating an average total delay cost per schedule interrupt event type comprises:
    calculating a total number of delay events for the particular schedule interrupt event grouping, the total number of delay events for the particular schedule interrupt event grouping including all delay events for the event grouping; and
    multiplying the total number of delay events for the particular schedule interrupt event grouping with the average delay hours with partial schedule interrupt event counts removed and with the cost per delay hour.

13. The method of claim 12 wherein the cost per delay hour is taken from statistics provided by an Airline Economic Analysis Organization for the specific model and series of aircraft.

14. The method of claim 11 further comprising calculating a total cost per schedule interrupt event type.

15. The method of claim 11 further comprising ranking each schedule interrupt event type based on the average cost per schedule interrupt event type.

16. The method of claim 11 further comprising: entering data relating to schedule interrupt events into a database; and
    summarizing schedule interrupt events for a specified period of time and for a specific type of aircraft in the database.

* * * * *